Sept. 23, 1930.  A. J. ALLYN  1,776,343
PIPE SHIM OR CLAMP
Filed May 16, 1929
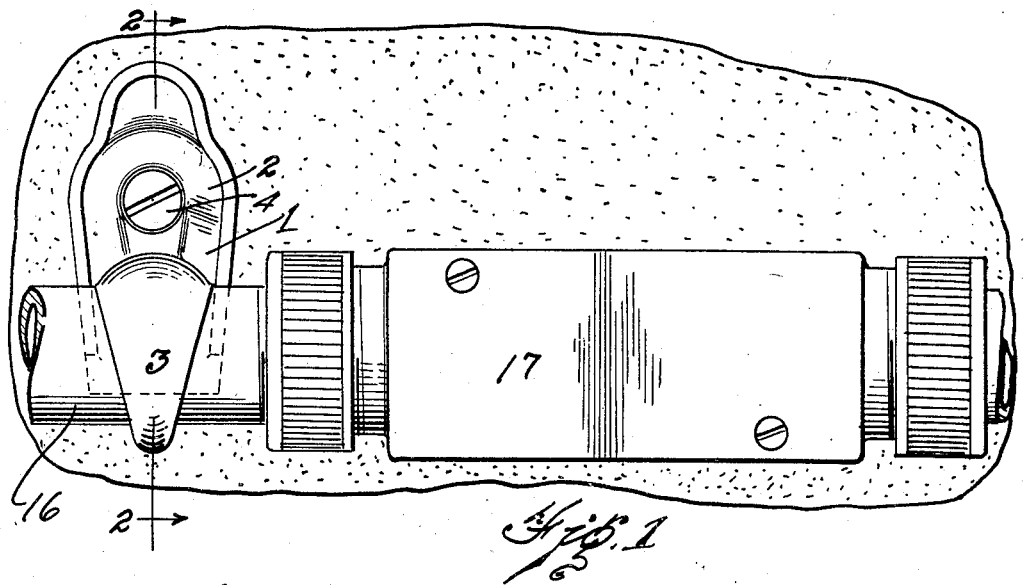
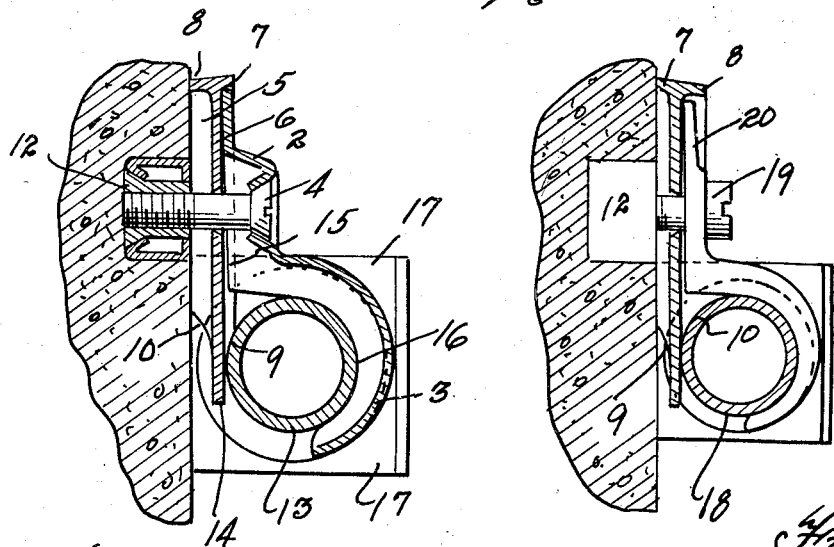
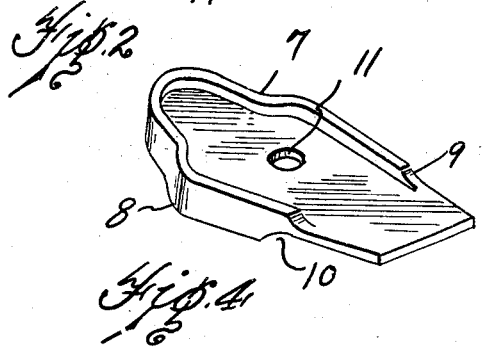
INVENTOR.
ARTHUR J. ALLYN
BY
ATTORNEY.

Patented Sept. 23, 1930

1,776,343

UNITED STATES PATENT OFFICE

ARTHUR J. ALLYN, OF DETROIT, MICHIGAN

PIPE SHIM OR CLAMP

Application filed May 16, 1929. Serial No. 363,615.

This invention relates to pipe shims or clamps, and the object of the invention is to provide a cheap and efficient shim for pipes such as electrical conduits, water pipes and the like which it is desired to secure relative to a wall, beams or supporting element.

Heretofore, it has been the practice to provide a clamp having an integral base and a hook end portion engaging over the pipe attached as by means of a screw or bolt extending through the base into the wall or structure relative to which the pipe is to be supported. Due to the differences in distance of pipes of different sizes from the surfare relative to which the pipe is to be secured, the previous hook like clamp with the integral base is inefficient in that the base does not seat securely against the surface to which it is fastened by reason of the pipe being a little too far from the said supporting surface.

The purpose of this invention is to provide a shim to be utilized as a base for a clamp of any desired type in which there is a pipe engaging portion and a base portion and this shim is formed with a projecting portion to engage the side of the pipe opposite that engaged by the clamp and also to provide means for preventing the shim from being turned out of registration with the clamp portion.

A further object of the invention is to provide a shim for the purpose stated adaptable for use on pipe positioned at different distances from the surface relative to which the pipe is to be supported.

These and other objects and the various novel features are hereinafter more fully described and claimed, and the preferred form of construction of a shim embodying my invention is shown in the accompanying drawing in which—

Fig. 1 is an elevation of an electrical conduit or pipe with a clamp and my improved shim in place thereon.

Fig. 2 is a section taken on line 2—2 of Fig. 1.

Fig. 3 is a similar section of a smaller pipe element with a slightly different form of clamp.

Fig. 4 is a perspective view showing the preferred form of the shim.

With conduits such as the conduits for electric wiring or water or gas pipes and the like it is necessary to secure the pipe at intervals relative to a wall or ceiling or other structure and as previously stated the usual practice heretofore is to provide a hook like element such as is shown at 1 having an integral base 2 and a hook end 3 the latter of which engages over the pipe as will be understood from Fig. 2. A screw 4 is usually provided to fasten the clamp to the supporting structure.

My improvement consists in the combination with this general form of clamp of a shim 5 which may be a casting having a central web portion 6, a flange 7 on one edge and a flange 8 on the other of a different height and these flanges, as will be seen from Figs. 2 and 4, extend outwardly preferably to the web and with the ends curved as at 9 and 10 to fit against the pipe.

Thus, when the shim is in place, there being two ends of the flange engaging the pipe, it is held from turning on the screw 4 which passes through an aperture 11 provided in the shim. The flange 7 or 8 has a shape corresponding to the shape of the base 2 of the clamp and it is to be understood that the form of the flange may be varied in outline as may be found convenient depending upon the form and outline of the base of the clamp with which it is to be used. The screw passes through an aperture in the clamp as shown and through the shim and when the pipe is to be secured relative to a concrete wall an anchor of any desired nature threaded to receive the screw may be provided as indicated at 12 in Figs. 2 and 3. The hook end of the clamp, as shown in Fig. 2, engages one side of the pipe 13 while the end 14 of the shim engages the side of the pipe opposite that engaged by the hook 3 and it is to be noted that the hook is so made that the diameter of the pipe is slightly greater than the distance between the base line 15 of the hook to the high point 16 of the hook portion and thus in fastening the screw in place the pipe is clamped between the hook 3 and portion 14 of the shim. By this arrangement it will be observed that it is impossible for the shim and the clamp to turn upon the screw as an axis due to the fact that the pipe is engaged at two points by the ends 9 or 10 of the flanges in the shim and the hook itself extends over nearly half the circumference of the pipe and thus the clamp is not readily displaced except by removal of the screw.

Further than this it is not possible for the clamp to turn relative to the shim due to the fact that the base of the clamp is supported within the flange 7 or 8 as the case may be depending upon which side of the shim is positioned in engagement with the supporting surface.

As previously stated, the flange 7 is of less height above the web 6 than the flange 8 and thus when the flange 8 is placed in contact with the supporting surface the outer face of the portion 14 of the shim is at a greater distance from the supporting surface than would be the case if the flange 7 were positioned thereagainst. This latter position is shown in Fig. 3 and illustrates one service to which this shim may be put.

The structure shown in Fig. 2 is approximately that for use with a three-fourths inch pipe and the outlet box 17 to which the pipe is attached practically determines the distance of the pipe from the wall. When a one-half inch pipe is used as is shown at 18 in Fig. 3, such pipe is naturally a less distance from the supporting surface in which case the shim will be turned reverse of that shown in Fig. 3. The same general relationship of the clamp, shim and pipe, however, are the same in either instance. The clamp shown in Fig. 3 has a conical recess in its base for the head of the screw but where a different type of clamp base is used, as is illustrated in Fig. 3, a different type of screw may be utilized as shown at 19 and the base need not be provided with a conical recess as in Fig. 3. One of the functions of the shim illustrated in Fig. 3 will be understood from the following.

With the old types of clamp in which the base 20 of the clamp would be placed directly upon the surface of the wall or support, the head of the screw will only bear at one point due to the slant which the base assumes relative to the wall surface. By use of my improved shim this angularity of the base is materially reduced and thus enables the head of the screw to engage practically throughout its circumference against the base of the clamp.

Thus, it will be seen that a much more secure and efficient device is provided by the use of my shim which enables the clamp to be utilized with pipes of varying distances from the surface relative to which it is to be supported without the clamp standing at inconvenient angles relative to the supporting surface and, by making the shim with flanges of different heights it is more available for varying distances. This distance of the pipe from the supporting surface may also vary somewhat in the same pipe due either to irregularities in the wall surface or to bends in the pipe.

It is also to be noted that the invention is not limited to the character of the screw or to the structure relative to which the pipe is to be supported relative to a thin metal or marble plate and where the pipe is to be secured against a wooden partition an ordinary wood or lag screw may be utilized.

It will be evident from the foregoing that the shim may be of a shape to be utilized in conjunction with the well known clamps now in commerce it only requiring to be of a form corresponding to that of the clamp utilized.

It is further evident that the device is extremely simple and inexpensive not adding materially to the cost of the installation and further enhancing the appearance of the installation and the secureness with which the piping is supported in place.

Having thus briefly described my invention, what I claim is—

1. A shim for the purpose described consisting of a single piece of metal having a portion adapted to extend beneath a pipe or conduit, both side faces of the shim being provided with a projecting portion adapted for contact with the surface providing a support of the pipe, the construction being such that the pipe engaging portion is varied in its distance from the supporting surface depending upon which face of the shim is placed in contact with the surface.

2. A shim for the purpose described consisting of a metal element one end of which is adapted to engage a pipe in opposition to a clamp and further being provided with a projecting portion on each of the opposite sides, the projection upon one side being of greater height than that upon the other whereby the distance of the pipe supporting portion of the shim from the surface to which it is secured may be varied by positioning one or the other of the said projections in contact with the supporting surface, the projecting portions further being shaped to provide a recess for the base of a clamp.

3. A shim providing a support for a pipe clamp after the manner described consisting of a metal plate having an end portion to engage the pipe on the side opposite the clamp and in the remaining portion having an upstanding peripheral flange on each of its opposite sides, that on one side being less in height than that on the other and adapting the device to be reversed in position to vary the distance to which the pipe engaging portion thereof is spaced from the supporting element, said flanges terminating short of the said pipe engaging end it being curved at their end portions to contact the pipe.

4. A shim providing a support for the base of a pipe clamp after the manner described consisting of a metal plate formed at one of its ends and on opposite sides with a recess conforming substantially to the outline of the clamp base and providing a seat for the base, the shim and the clamp base being apertured to receive a fastening element and the shim further having a portion to extend beneath a pipe on the side opposite that engaged by the clamp, the seat for the clamp base maintaining the respective pipe engaging portions of the clamp and the shim in alignment, and means on the shim when in engagement with the pipe preventing the turning of the shim on the fastening element.

5. A shim providing a support for the base of a pipe clamp after the manner described consisting of a metal plate formed at one of its ends and on both sides with a recess conforming substantially to the outline of the clamp base and providing a seat therefor holding the clamp and shim in a predetermined relationship when secured together, the shim having a portion at one end for engaging a pipe and being adapted to be placed with either of its sides in engagement with the surface of a supporting element, the pipe engaging portion of the shim being farther from the supporting surface when one of its sides is in contact therewith than is the case when the other side is in contact therewith.

In testimony whereof I sign this specification.

ARTHUR J. ALLYN.